(12) United States Patent
Takahashi

(10) Patent No.: US 7,691,538 B2
(45) Date of Patent: Apr. 6, 2010

(54) NONAQUEOUS ELECTROLYTE SECONDARY BATTERY

(75) Inventor: Kentaro Takahashi, Moriguchi (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 0 days.

(21) Appl. No.: 12/055,704

(22) Filed: Mar. 26, 2008

(65) Prior Publication Data

US 2008/0241702 A1    Oct. 2, 2008

(30) Foreign Application Priority Data

Mar. 28, 2007 (JP) .............................. 2007-083490

(51) Int. Cl.
*H01M 6/16* (2006.01)
*H01M 6/04* (2006.01)
(52) U.S. Cl. .................. 429/332; 429/188; 429/343
(58) Field of Classification Search .................. None
See application file for complete search history.

(56) References Cited

U.S. PATENT DOCUMENTS

2003/0165733 A1* 9/2003 Takehara et al. ............ 429/101
2004/0058251 A1* 3/2004 Hamamoto et al. .......... 429/332

FOREIGN PATENT DOCUMENTS

| JP | 2000-299127 | * 10/2000 |
| JP | 2003-59529 A | 2/2003 |
| JP | 2006-32301 A | 2/2006 |
| JP | 2006-294373 A | 10/2006 |

WO    02/15319 A1    2/2002

OTHER PUBLICATIONS

IPDL PAJ JPO machine translation for JP 2000-299127 (Oct. 2000), Torida et al.*

\* cited by examiner

*Primary Examiner*—Dah-Wei D Yuan
*Assistant Examiner*—Adam A Arciero
(74) *Attorney, Agent, or Firm*—Westerman, Hattori, Daniels & Adrian, LLP

(57) ABSTRACT

In a nonaqueous electrolyte secondary battery according to an embodiment of the invention, a nonaqueous electrolyte contains: a tertiary carboxylate ester represented by the following general formula (1) in an amount of a range of 3% by mass or more and 80% by mass or less based on the total mass of the nonaqueous solvent:

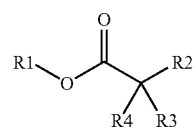

(1)

where R1, R2, R3, R4 represent a (C1 to 4) alkyl group, respectively, and one or more acid anhydride selected from succinic anhydride, glutaric anhydride, and glycolic anhydride in an amount of a range of 0.1% by mass or more and 5% by mass or less based on the total mass of the nonaqueous electrolyte. By containing such a constitution, in other words, by containing a nonaqueous solvent capable of stabilizing the coating film of the negative electrode, a nonaqueous electrolyte secondary battery in which not only can satisfactory cycle performance and retention characteristics be obtained, but also the overcharging performance is largely improved, can be provided.

2 Claims, 1 Drawing Sheet

FIG.1A
FIG.1B
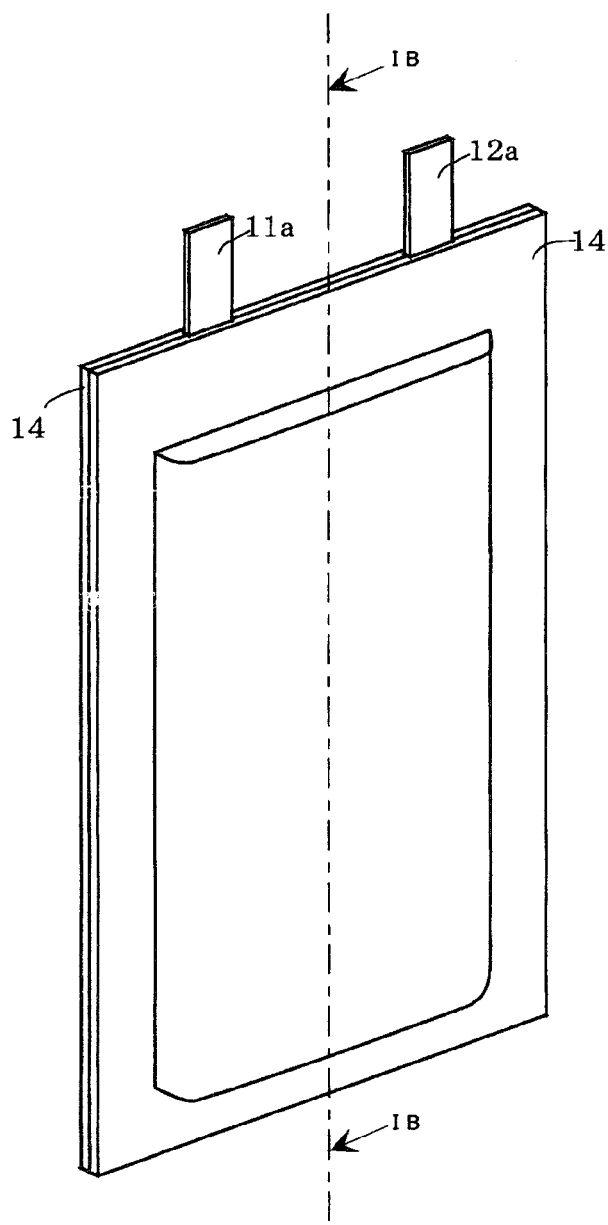
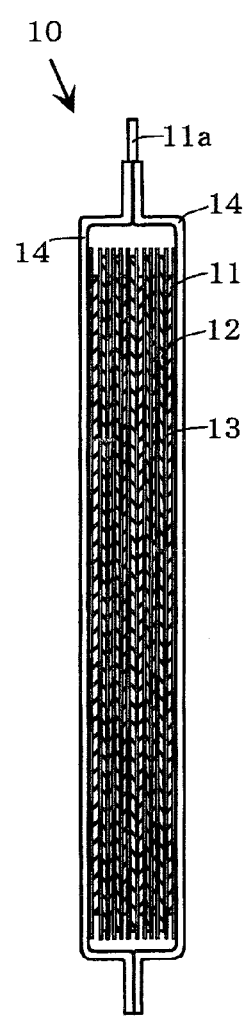

NONAQUEOUS ELECTROLYTE SECONDARY BATTERY

BACKGROUND

1. Technical Field

The present invention relates to a nonaqueous electrolyte secondary battery containing a positive electrode having a positive electrode active material capable of intercalating/deintercalating lithium ions; a negative electrode having a negative electrode active material capable of intercalating/deintercalating lithium ions; and a nonaqueous electrolyte in which an electrolyte composed of a lithium salt is dissolved in a nonaqueous solvent.

2. Related Art

Recently, downsizing and weight saving of a mobile information terminal such as a mobile telephone, a notebook computer, and a PDA are rapidly developing. Under such a background, a nonaqueous electrolyte secondary battery having a high energy density and a high capacity and represented by a lithium battery has been widely utilized as a driving power source for such a mobile information terminal. Such a nonaqueous electrolyte secondary battery is constituted usually using a positive electrode composed of a lithium-containing transition metal compound oxide such as $LiCoO_2$, $LiNiO_2$, $LiMn_2O_4$, $LiFeO_2$, a negative electrode composed of carbonaceous materials such as graphite and a nonaqueous electrolyte in which an electrolyte composed of a lithium salt is dissolved in a nonaqueous solvent.

In such a nonaqueous electrolyte secondary battery, a nonaqueous electrolyte composed of a nonaqueous solvent and an electrolyte is used. As the nonaqueous solvent of the nonaqueous electrolyte, generally used is a solvent mixture in which a cyclic carbonate ester and a chain-shaped carbonate ester are mixed. Though with such a solvent mixture, excellent discharging properties have been obtained, oxidation resistance and reactivity with lithium are not necessarily stable, so that a disadvantage is caused that the safety of the battery is poor. Particularly, diethyl carbonate (DEC) has a disadvantage that it causes an uncontrollable exothermic reaction with lithium at around 90° C. Further, though dimethyl carbonate (DMC) has not exhibited such a high reactivity with lithium as that of DEC, DMC suffers from the disadvantage of having a low flash point and poor cycle performance.

On the surface of the material becoming a negative electrode active material of such a nonaqueous electrolyte secondary battery, a nonaqueous solvent becoming a component of the nonaqueous electrolyte becomes engaged and a side reaction affecting adversely the battery properties is caused. Therefore, for preventing a direct reaction of the negative electrode with the nonaqueous solvent, it has become an important task not only to form a coating film on the surface of the negative electrode, but also to control the formed state and the properties of the coating film. As a technology for controlling such a negative electrode surface coating film (SEI: solid electrolyte interface), adding a special additive into the nonaqueous electrolyte is generally known.

Here, for improving the overcharging performance, heretofore, an aromatic hydrocarbon such as cyclohexylbenzene (CHB) and biphenyl (BP) or a redox shuttle agent such as anisole have been added to the nonaqueous electrolyte. However, many of them have only unsatisfactory effect and for obtaining satisfactory effect, the added amount thereof is needed to be enlarged. When the added amount thereof is enlarged, a new disadvantage is caused that the high temperature retention characteristics and the cycle performance is significantly lowered.

Therefore, enlarging the adding ratio of a nonaqueous solvent having a high flash point such as ethylene carbonate (EC) and propylene carbonate (PC) and an improvement of using a new flame retardant nonaqueous solvent are attempted. However, since ethylene carbonate (EC), propylene carbonate (PC), and a flame retardant nonaqueous solvent have poor oxidation resistance, a disadvantage is caused that the retention characteristics and the cycle performance are lowered. Further, carboxylate esters have such an advantage that due to a strong oxidation resistance thereof, the reactivity thereof with the positive electrode becomes moderate. However, since they have a high reactivity with the negative electrode and consequently, are easily reduction-decomposed, the negative electrode coating film becomes unstable and they are poor in the cycle performance and the retention stability Therefore, it is difficult to use carboxylate esters as a nonaqueous solvent.

Further, tertiary carboxylate esters have a structure having high stability against an attack of a nucleophilic agent generated on the negative electrode by the increase of electron density of a carbonyl carbon and increase of steric hindrance due to a tertiary alkyl group thereof and further, by having no reactive active a hydrogen. As a result, they have higher thermal stability with a charging graphite negative electrode, metal lithium, lithium-Sn, Si alloy than that of a chain carbonate ester solvent. However, when they are used in a large amount, a disadvantage is caused that with respect to the cycle performance and the retention characteristics, a satisfactory performance cannot be obtained.

Therefore, it has been developed in WO 2002/015319 to stabilize the negative electrode coating film by mixing a cyclic carbonate ester or vinylene carbonate with tertiary carboxylate esters. Further, it has also been developed in JP-A-2003-59529 that by mixing divinylsulfon or alkine derivatives having a triple bond, the cycle performance and the high temperature retention characteristics can be improved. Further, it has also been developed in JP-A-2006-32301 that by mixing cyclic ester derivatives (such as FEC) having a halogen atom, the negative electrode is stabilized to improve the cycle performance. Further, it has also been developed in JP-A-2006-294373 to use a nonaqueous electrolyte containing succinic anhydride, glutaric anhydride, and diglycolic anhydride as a cyclic acid anhydride.

Here, in the nonaqueous electrolyte secondary battery developed in WO 2002/015319, since carboxylate esters or vinylene carbonate is mixed with tertiary carboxylate esters, the negative electrode coating film is stabilized and the cycle performance becomes improved. Further, in the nonaqueous electrolyte secondary battery developed in JP-A-2003-59529, by mixing divinylsulfon or alkine derivatives having a triple bond with the nonaqueous electrolyte, the cycle performance and the high temperature retention characteristics become improved. Further, in the nonaqueous electrolyte secondary battery disclosed in JP-A-2006-32301, by mixing cyclic ester derivatives (such as FEC) having halogen atoms, the negative electrode coating film is stabilized and the cycle performance becomes improved.

Further, in the nonaqueous electrolyte secondary battery developed in JP-A-2006-294373, since the nonaqueous electrolyte contains succinic anhydride, glutaric anhydride, and diglycolic anhydride as a cyclic acid anhydride, a decomposition reaction of the nonaqueous electrolyte is suppressed and consequently, the cycle performance becomes improved.

However, in the nonaqueous electrolyte secondary battery developed in the WO 2002/015319, since the coating film formation with a cyclic carbonate ester on the surface of the negative electrode is not satisfactory, the content of a tertiary carboxylate ester is confined within a range of 35% by mass or less and due to this small content, a disadvantage is caused that satisfactory cycle performance or retention characteristics cannot be obtained. Further, also in the nonaqueous electrolyte secondary battery developed in JP-A-2003-59529, the added amount of a tertiary carboxylate ester is in the range of 1 to 6% by mass, even at most around 20% by mass, so that a disadvantage is caused that satisfactory cycle performance or retention characteristics cannot be obtained.

Further, in the nonaqueous electrolyte secondary battery developed in JP-A-2006-32301, the cycle performance is improved by stabilizing the negative electrode coating film. However, since during retention at high temperatures and continuous charging, a generation of a large amount of gas is accompanied, a disadvantage is caused that satisfactory cycle performance or retention characteristics cannot be obtained. Further, in the nonaqueous electrolyte secondary battery developed in JP-A-2006-294373, the nonaqueous electrolyte contains succinic anhydride, glutaric anhydride, and diglycolic anhydride as a cyclic acid anhydride. However, since such a cyclic acid anhydride is contained in a cyclic carboxylate ester having a halogen atom, a disadvantage is caused that satisfactory cycle performance or retention characteristics cannot be obtained.

SUMMARY

An advantage of some aspects of the invention is to provide a nonaqueous electrolyte secondary battery in which not only can satisfactory cycle performance and retention characteristics be obtained, but also the overcharging performance is largely improved by incorporating a nonaqueous solvent capable of stabilizing the negative electrode coating film.

In a nonaqueous electrolyte secondary battery according to an aspect of the invention, a nonaqueous electrolyte contains: a tertiary carboxylate ester represented by the following general formula (1) in an amount of a range of 3% by mass or more and 80% by mass or less based on the total mass of the nonaqueous solvent:

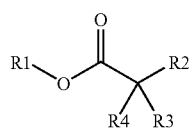

(1)

where R1, R2, R3, R4 represent a (C1 to 4) alkyl group, respectively, and one or more acid anhydride selected from succinic anhydride, glutaric anhydride, and glycolic anhydride in an amount of a range of 0.1% by mass or more and 5% by mass or less based on the total mass of the nonaqueous electrolyte.

Here, though a reduction-decomposed product of the tertiary carboxylate ester significantly lowers the lithium ion penetrativity of the negative electrode surface coating film (SEI), by adding one or more acid anhydride selected from succinic anhydride, glutaric anhydride, and glycolic anhydride in the nonaqueous electrolyte beforehand, SEI properties are improved and battery properties are stabilized. Though the detail of the reason therefor is unclear, it is assumed that it is because the concentration of oxygen atoms in the negative electrode surface coating film (SEI) is increased and consequently, the lithium ion penetrativity is improved. Thus, a nonaqueous electrolyte secondary battery in which not only can satisfactory cycle performance and retention characteristics be obtained, but also the overcharging performance is largely improved, can be obtained.

In this case, when the content of the tertiary carboxylate ester in the nonaqueous solvent is less than 3% by mass based on the total mass of the nonaqueous solvent, the effect of incorporating the tertiary carboxylate ester cannot be exhibited. On the contrary, when the content of the tertiary carboxylate ester is so large as more than 80% by mass, the battery properties are affected adversely. This is because when the content is more than 80% by mass, a reduction-decomposition on the negative electrode cannot be suppressed, so that the negative electrode surface coating film becomes unstable. Thus, it can be mentioned that the content of the tertiary carboxylate ester is preferably 3% by mass or more and 80% by mass or less based on the total mass of the nonaqueous solvent.

Further, when the added amount of the acid anhydride composed of succinic anhydride, glutaric anhydride, and glycolic anhydride is less than 0.1% by mass based on the total mass of the nonaqueous electrolyte, the concentration of oxygen atoms is not so increased in the negative electrode surface coating film (SEI), so that the lithium ion penetrativity is not improved. On the other hand, when the added amount of succinic anhydride as a cyclic acid anhydride is so large as more than 5% by mass based on the total mass of the nonaqueous electrolyte, it is considered that the resistance of the negative electrode surface coating film (SEI) becomes large, so that the charging performance of the negative electrode is lowered. Thus, it can be mentioned that the added amount of one or more acid anhydride selected from succinic anhydride, glutaric anhydride, and glycolic anhydride is preferably 0.1% by mass or more and 5% by mass or less based on the total mass of the nonaqueous electrolyte.

The tertiary carboxylate ester is desirably selected from methyl pivalate, ethyl pivalate, propyl pivalate, isopropyl pivalate, methyl 2,2-dimethylbutanate, methyl 2-ethyl-2-methylbutanate, ethyl 2,2-diethylbutanate, and ethyl 2,2-diisopropylpropanate, and used.

In the nonaqueous electrolyte secondary battery of the present aspect of the invention, a nonaqueous electrolyte in which not only is a predetermined amount of a tertiary carboxylate ester stabilizing the negative electrode coating film contained, but also a nonaqueous electrolyte to which a predetermined amount of one or more acid anhydride selected from succinic anhydride, glutaric anhydride, and glycolic anhydride is added, is used, so that by a synergistic effect of these materials, a nonaqueous electrolyte secondary battery in which not only can satisfactory cycle performance and retention characteristics be obtained, but also the overcharging performance is largely improved, can be provided.

BRIEF DESCRIPTION OF THE DRAWINGS

The invention will be described with reference to the accompanying drawing, wherein like numbers reference like elements.

FIG. 1 is a view schematically showing the nonaqueous electrolyte secondary battery of the present invention. FIG.

DESCRIPTION OF EXEMPLARY EMBODIMENTS

Next, the embodiments of the present invention are described with reference to FIG. 1. However, the invention is not limited to these embodiments at all and the invention can be embodied by appropriately altering the invention so long as the object of the present invention is not changed. FIG. 1 is a view schematically showing the nonaqueous electrolyte secondary battery of the present invention. FIG. 1A is a perspective view and FIG. 1B is a cross sectional view taken along the line IB-IB of FIG. 1A

1. Nonaqueous Electrolyte Secondary Battery (1) General Constitution

In the nonaqueous electrolyte secondary battery 10 of the invention, as shown in FIG. 1, each belt-shaped separator 13 is interposed between each belt-shaped positive electrode 11 and each belt-shaped negative electrode 12, and not only are these parts wound in a spiral shape to prepare a spiral-shaped electrodes group, but also this spiral-shaped electrodes group is depressed into a flat shape and held in an outer package 14 composed of an aluminum laminate film. And into the outer package 14, a nonaqueous electrolyte in which $LiPF_6$ as an electrolyte is dissolved (to be 1.0 mol/L) in a nonaqueous solvent with which a tertiary carboxylate ester and a cyclic acid anhydride are mixed, is poured and an opening part of the outer package 14 is sealed. From the upper terminal of the belt-shaped positive electrode 11, a positive electrode current collecting strip 11a is extended and from the upper terminal of the belt-shaped negative electrode 12, a negative electrode current collecting strip 12a is extended.

(2) Positive Electrode

The belt-shaped positive electrode 11 is formed by applying a positive electrode active material slurry to both surfaces of a positive electrode substrate (for example, an aluminum foil or aluminum mesh having a thickness of 15 μm) and by drying the positive electrode active material slurry to form a positive electrode active material layer. The belt-shaped positive electrode 11 is rolled to a thickness of 0.12 mm to be formed. In the upper part of the positive electrode substrate, the positive electrode current collecting strip 11a is allocated. Here, the positive electrode active material slurry is prepared by dissolving a mixture in which lithium cobalt oxide ($LiCoO_2$) as the positive electrode active material, a carbon-based conductant such as acetylene black or graphite, and polyvinylidenefluoride (PVdF) as a binder are mixed so that a solid content mass ratio of them becomes 90:5:5 in N-methyl-2-pyrrolidone (NMP) as an organic solvent, and by mixing and kneading the resultant mixture.

In this case, as the positive electrode active material, a lithium-transition metal compound oxide represented by $Li_xMO_2$ (where M is at least one of Co, Ni, and Mn) is used and more specifically, $LiCoO_2$, $LiNiO_2$, $LiNi_yCo_{1-y}O_2$ (y=0.01 to 0.99), $LiMnO_2$, and $LiCo_xMn_yNi_zO_2$ (x+y+z=1) are used individually or in combination thereof. Among them, in the invention, particularly, an active material containing nickel which is generally believed to be poor in thermal stability is preferably used from the viewpoint of improving the energy density (3) Negative Electrode The belt-shaped negative electrode 12 is formed by applying a negative electrode active material slurry to both surfaces of a negative electrode substrate (for example, a copper foil having a thickness of 10 μm) and by drying the negative electrode active material slurry to form a negative electrode active material layer. The belt-shaped negative electrode 12 is rolled to a thickness of 0.13 mm to be formed. The negative electrode active material slurry is prepared by dissolving an artificial graphite ($d_{(002)}$ value=0.336 nm) of which surface is amorphized as a negative electrode active material and polyvinylidenefluoride (PVdF) as a binder in N-methyl-2-pyrrolidone (NMP) as an organic solvent, and by mixing and kneading the resultant mixture.

The negative electrode active material is selected from the group consisting of a carbonaceous material capable of intercalating/deintercalating lithium, a metal oxide, a simple, alloy or compound of tin, and a simple, alloy or compound of silicon, and is desirably used as a mixture of at least two of them. Among them, in the invention, particularly an artificial or natural graphite of which surface is amorphization-treated is preferably used in terms of the stability of the cycle performance.

(3) Nonaqueous Electrolyte

First, as a tertiary carboxylate ester represented by a general formula (1):

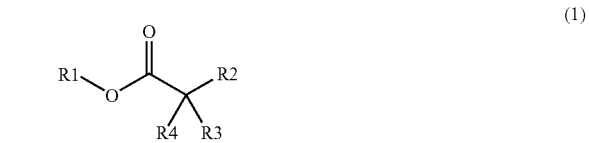

(1)

where R1, R2, R3, R4 represent a (C1 to 4) alkyl group, respectively, methyl pivalate represented by a general formula (1) (where R1=R2=R3=R4=methyl group) is prepared. Next, in a solvent mixture in which ethylene carbonate (EC), propylene carbonate (PC), and methyl pivalate are mixed so that the mass ratio thereof becomes 30:10:60, succinic anhydride as a cyclic acid anhydride is added so that the content thereof becomes 0.3% by mass based on the total mass of the nonaqueous electrolyte, and $LiPF_6$ as an electrolyte is dissolved in a concentration of 1 mol/L to prepare a nonaqueous electrolyte a1.

Further, a nonaqueous electrolyte b1 is prepared by changing only succinic anhydride to glutaric anhydride (without changing the added amount of the cyclic acid anhydride) among the above constitution of the nonaqueous electrolyte a1, and a nonaqueous electrolyte c1 is prepared by changing only succinic anhydride to diglycolic anhydride among the above constitution of the nonaqueous electrolyte a1. A nonaqueous electrolyte d1 is prepared by changing only succinic anhydride to maleic anhydride among the above constitution of the nonaqueous electrolyte a1, and a nonaqueous electrolyte e1 is prepared by changing only succinic anhydride to phthalic anhydride among the above constitution of the nonaqueous electrolyte a1. Further, a nonaqueous electrolyte x1 is prepared in substantially the same manner as that of the nonaqueous electrolyte a1, except that the cyclic acid anhydride is not added. A nonaqueous electrolyte y1 is prepared by dissolving $LiPF_6$ as an electrolyte in a concentration of 1 mol/L in a solvent mixture in which ethylene carbonate (EC), propylene carbonate (PC), and diethyl carbonate (DEC) are mixed so that the mass ratio thereof becomes 30:10:60. Further, a nonaqueous electrolyte z1 is prepared by dissolving $LiPF_6$ as an electrolyte in a concentration of 1 mol/L in a solvent mixture in which ethylene carbonate (EC) and propylene carbonate (PC) are mixed so that the mass ratio thereof becomes 50:50.

Examples of nonaqueous solvents used besides the tertiary carboxylate ester include carbonates, lactones, ethers, and esters. These solvents can be used in combination of two or more thereof. Among them, carbonates and lactones are preferred and cyclic carbonates are more preferred. Specific examples thereof include ethylene carbonate, propylene carbonate, dimethyl carbonate, methyl ethyl carbonate, diethyl carbonate, γ-butylolactone, γ-valerolactone, γ-dimethoxyethane, tetrahydrofuran, and 1,4-dioxane.

Further, examples of the electrolyte besides the above lithium hexafluorophosphate ($LiPF_6$) include lithium salts such as lithium perchlorate ($LiClO_4$), lithium tetrafluoroborate ($LiBF_4$), lithium hexafluoroarsenate ($LiAsF_6$), lithium trifluoromethanesulfonate ($LiCF_3SO_3$), bistrifluoromethylsulfonylimide lithium ($LiN(CF_3SO_2)_2$), and bispentafluoroethylsulfonylimide lithium ($LiN(C_2F_5SO_2)_2$). Among them, $LiPF_6$ and $LiBF_4$ are preferred to be used and the dissolving amount thereof in the nonaqueous solvent is preferably 0.5 to 2.0 mol/L.

2. Production Method

Next, the production method of the nonaqueous electrolyte secondary battery of the invention having the above-described constitution is described below.

(1) Production Method of Positive Electrode

A positive electrode mixture is prepared by mixing lithium cobalt oxide ($LiCoO_2$) powder as the positive electrode active material and a carbon-based powder (for example, 5% by mass) such as acetylene black or graphite as a conductant. The positive electrode mixture is kneaded with a binder solution in which a binder (for example, 3% by mass) composed of polyvinylidene fluoride (PVdF) is dissolved in an organic solvent composed of N-methyl-2-pyrrolidone (NW) to prepare a positive electrode active material slurry.

Next, to both surfaces of the positive electrode substrate composed of aluminum foil (for example, having a thickness of 15 μm), the positive electrode active material slurry is homogeneously applied using a die coater or a doctor blade to form a positive electrode mixture layer. Thereafter, the resultant positive electrode is passed through a dryer to remove the organic solvent (NMP) which has been needed during the preparation of the slurry to dry the positive electrode. After the drying, the positive electrode is rolled using a roll-pressing machine to a thickness of 0.12 mm and is cut into a predetermined shape to produce the belt-shaped positive electrode 11. In the belt-shaped positive electrode 11, to a part arranged in the outermost circumference part during the winding, the positive electrode slurry is not applied and to this part, as extended upper from the belt-shaped positive electrode 11, an aluminum-made current collecting strip 11a is ultrasonically fuse-bonded.

(2) Production Method of Negative Electrode

The negative electrode active material slurry is prepared by kneading a powder of an artificial graphite ($d_{(002)}$ value=0.336 nm) of which surface is amorphized as the negative electrode active material, with a binder solution in which a binder (for example 3% by mass) composed of polyvinylidenefluoride (PVdF) is dissolved in an organic solvent composed of N-methyl-2-pyrrolidone (NMP). Next, a negative electrode substrate (for example, copper foil having a thickness of 10 μm) is prepared and the negative electrode active material slurry produced as described above is homogeneously applied to both surfaces of the negative electrode substrate using die coater or doctor blade to form a negative electrode mixture layer.

Thereafter, the resultant negative electrode is passed through a dryer to remove the organic solvent (NMP), which has been needed during the preparation of the slurry, to dry the negative electrode. After the drying, the negative electrode is rolled using a roll-pressing machine to a thickness of 0.13 mm and is cut into a predetermined shape to produce the belt-shaped negative electrode 12. In the belt-shaped negative electrode 12, to a part arranged in the outermost circumference part during the winding, the negative electrode slurry is not applied and to this part, as extended upper from the belt-shaped negative electrode 12, a nickel-made current collecting strip 12a is ultrasonically fuse-bonded.

(3) Production Method of Nonaqueous Electrolyte Secondary Battery

Next, the belt-shaped positive electrode 11 and belt-shaped negative electrode 12 produced as described above are prepared and between them, a belt-shaped separator 13 composed of a polyolefin-based resin-made fine porous film (having a thickness of 0.016 mm) is interposed, while conforming the center lines thereof in the width direction to each other. Thereafter, this part is wound in a spiral shape using a winding machine and the outermost circumference thereof is bound with a tape to form a spiral-shaped electrodes group. Next, this group is crushed into a flat elliptical shape of the cross section shape thereof to produce a flat-shaped electrodes group.

Next, the flat-shaped electrodes group is housed in an outer package 14 composed of an aluminum laminate film and these are arranged in a dry box. Thereafter, the electrolytes a1 to e1 and x1 to z1 prepared as described above respectively are poured into the outer package 14. Next, an atmosphere within the dry box is sucked using a vacuum pump to change the atmosphere to a reduced-pressure atmosphere and the electrolyte poured into the outer package 14 is impregnated in the electrodes group. Thereafter, by sealing an opening part of the outer package 14, the nonaqueous electrolyte secondary batteries A1, B1, C1, D1, E1, X1, Y1, Z1 having a design capacity of 750 mAh are respectively produced.

At this time, the positive electrode current collecting strip 11a extended from the positive electrode 11 and the negative electrode current collecting strip 12a extended from the negative electrode 12 are liquid-tightly sealed to the upper opening part of the outer package 14. Here, a battery using nonaqueous electrolyte a1 is referred to as battery A1; a battery using nonaqueous electrolyte b1 is referred to as battery B1; a battery using nonaqueous electrolyte c1 is referred to as battery C1; a battery using nonaqueous electrolyte d1 is referred to as battery D1; and a battery using nonaqueous electrolyte e1 is referred to as battery E1. Further, a battery using nonaqueous electrolyte x1 is referred to as battery X1; a battery using nonaqueous electrolyte y1 is referred to as battery Y1; and a battery using nonaqueous electrolyte z1 is referred to as battery Z1.

3. Battery Test

Next, with respect to each of these batteries A1, B1, C1, D1, E1, X1, Y1 and Z, the cycle performance, 80° C. charge retention characteristics, and overcharging performance were measured as follows and the results shown in the following Table 1 were obtained.

(1) Cycle Performance

Cycle performance was measured as follows. First, the battery was constant current-charged at room temperature (about 23° C.) using a charging current of 1 It (750 mA) until the battery voltage reached 4.2 V and thereafter, the battery was constant voltage-charged at a constant voltage of 4.2 V of the battery voltage for 3 hours. Next, the battery was discharged at room temperature (about 23° C.) using a charging current of 1 It (750 mA) until the battery voltage became 2.75 V and from the discharging time at this time, a discharging capacity for the first cycle (initial discharging capacity) was measured. Such a charging/discharging cycle was repeated for 500 cycles and a discharging capacity for each cycle was measured. Then, a ratio of a discharging capacity for $500^{th}$ cycle to a discharging capacity for first cycle (initial capacity) was calculated as the cycle performance from the following numerical equation (1):

Cycle performance (%)=(discharging capacity for $500^{th}$ cycle/initial discharging capacity)×100   (1)

(2) 80° C. Charge Retention Characteristics

First, the battery was constant current-charged at room temperature (about 23° C.) using a charging current of 1 It (750 mA) until the battery voltage reached 4.2 V and thereafter, the battery was constant voltage-charged at a constant voltage of 4.2 V of the battery voltage for 3 hours. Next, the battery was discharged at room temperature (about 23° C.) using a charging current of 1 It (750 mA) until the battery voltage became 2.75 V and from the discharging time at this time, a charging capacity before retention was measured. Next, the battery was retained in a thermostat of 80° C. for 96 hours and thereafter, the battery was charged/discharged under the same condition as that before retention to measure a discharging capacity after retention at 80° C. Then, a part of the outer package of each of batteries A1, B1, C1, D1, E1, X1, Y1, and Z1 after retention was cut and opened and not only was the amount of a generated gas in each battery measured, but also a ratio of a discharging capacity after retention to a discharging capacity before retention was measured as a capacity retention rate by calculating from the following numerical equation (2):

Capacity retention rate (%)=(discharging capacity after retention/discharging capacity before retention)×100   (2)

(3) Overcharging Performance 10 cells of each of batteries A1, B1, C1, D1, E1, X1, Y1, and Z1 were prepared and with respect to these batteries, the battery was constant current-charged at room temperature (about 25° C.) using a charging current of 2 It (1500 mA) until the battery voltage reached 12 V and thereafter, the battery was constant voltage-charged at a constant voltage of 12 V of the battery voltage for 8 hours. After the test, the number of cells in which disruption or firing has been caused was counted to measure the overcharging performance.

TABLE 1

| Battery | Type and content of solvent | | Cyclic acid anhydride | | Cycle property (%) | 80° C. Charge retention characteristics | | OP |
|---|---|---|---|---|---|---|---|---|
| | Type | Content (% by mass) | Type | Added amount (% by mass) | | Amount of generated gas (mL) | Capacity retention rate (%) | |
| A1 | EC/PC/Methyl pivalate | 30/10/60 | Succinic anhydride | 0.3 | 88 | 1.5 | 81 | 0 |
| B1 | EC/PC/Methyl pivalate | 30/10/60 | Glutaric anhydride | 0.3 | 86 | 1.4 | 80 | 0 |
| C1 | EC/PC/Methyl pivalate | 30/10/60 | Diglycolic anhydride | 0.3 | 90 | 2.5 | 78 | 0 |
| D1 | EC/PC/Methyl pivalate | 30/10/60 | Maleic anhydride | 0.3 | 55 | 6.1 | 37 | 3 |
| E1 | EC/PC/Methyl pivalate | 30/10/60 | Phthalic anhydride | 0.3 | 43 | 5.5 | 44 | 2 |
| X1 | EC/PC/Methyl pivalate | 30/10/60 | None | | 65 | 3.5 | 54 | 0 |
| Y1 | EC/PC/DEC | 30/10/60 | None | | 82 | 3.6 | 63 | 10 |
| Z1 | EC/PC | 50/50 | None | | 69 | 5.9 | 51 | 2 |

OP = Overcharging Performance

As is apparent from the results shown in Table 1, in the battery A1 using the nonaqueous electrolyte a1 in which the solvent contained a tertiary carboxylate ester represented by the above general formula (1) (in this case, methyl pivalate represented by a general formula (1) (where R1=R2=R3=R4=methyl group)), and succinic anhydride as a cyclic acid anhydride; in the battery B1 using the nonaqueous electrolyte b1 in which the solvent contained a tertiary carboxylate ester represented by the above general formula (1) (in this case, methyl pivalate), and glutaric anhydride as a cyclic acid anhydride; and in the battery C1 using the nonaqueous electrolyte c1 in which the solvent contained a tertiary carboxylate ester represented by the above general formula (1) (in this case, methyl pivalate), and glycolic anhydride as a cyclic acid anhydride, it is apparent that not only was the cycle performance improved and was the amount of a generated gas during the charge retention at 80° C. small, but also the capacity retention rate was large and the overcharging performance was improved.

On the contrary, even when the solvent of the nonaqueous electrolyte contained a tertiary carboxylate ester represented by the above general formula (1) (in this case, methyl pivalate represented by a general formula (1) (where R1=R2=R3=R4=methyl group)), in the battery D1 using the nonaqueous electrolyte d1 in which the solvent contained maleic anhydride which is another cyclic acid anhydride than succinic anhydride, glutaric anhydride and glycolic anhydride, and in the battery E1 using the nonaqueous electrolyte e1 in which the solvent contained phthalic anhydride which is also another cyclic acid anhydride, it is apparent that not only was the cycle performance lowered and was the amount of a generated gas during the charge retention at 80° C. large, but also the capacity retention rate was small and the overcharging performance was lowered.

Further, also in the battery X1 using the nonaqueous electrolyte x1 in which the solvent contained methyl pivalate and no cyclic acid anhydride, in the battery Y1 using the nonaqueous electrolyte y1 in which the solvent contained no methyl pivalate and no cyclic acid anhydride, but the solvent of a mixture composed of EC/PC/DEC contained an electrolyte, and in the battery Z1 using the nonaqueous electrolyte z1 in which the solvent of a mixture composed of EC/PC contained an electrolyte, it is apparent that not only was the cycle performance lowered and was the amount of a generated gas during the charge retention at 80° C. large, but also the capacity retention rate was small and the overcharging performance was lowered.

This is considered to be for the following reason. That is, a reduction-decomposed product of a tertiary carboxylate ester (in this case, methyl pivalate represented by the general formula (1) (where R1=R2=R4=methyl group)) lowers significantly the lithium ion penetrativity of the negative electrode surface coating film (SEI). However, when the nonaqueous electrolyte contains a cyclic acid anhydride such as succinic anhydride, glutaric anhydride, and glycolic anhydride, the properties of the negative electrode surface coating film (SEI) are improved and consequently, the battery properties are stabilized, which is considered to be the above reason. The detailed reason therefor is yet unclear, however, it can be assumed that since by the cyclic acid anhydride such as succinic anhydride, glutaric anhydride, and glycolic anhydride, the oxygen atom concentration in the negative electrode surface coating film (SEI) is increased and the lithium penetrativity is improved.

Thus, by incorporating in the solvent of the nonaqueous electrolyte, not only a tertiary carboxylate ester represented by the above general formula (1) (in this case, methyl pivalate represented by a general formula (1) (where R1=R2=R3=R4=methyl group)), but also one or more acid anhydride selected from succinic anhydride, glutaric anhydride, and glycolic anhydride, the overcharging performance can be largely improved without impairing the cycle performance, gas generating property during the charge retention at high temperatures, and capacity retention rate.

4. Added Amount of Cyclic Acid Anhydride

Next, the added amount of the cyclic acid anhydride was studied. First, using a solvent mixture in which EC, PC, and methyl pivalate as a tertiary carboxylate ester were mixed so that the mass ratio thereof became 30:10:60 and the added amount of succinic anhydride as a cyclic acid anhydride was varied to prepare nonaqueous electrolytes a2 to a8. Next, using these nonaqueous electrolytes a2 to a8, like as described above, nonaqueous electrolyte secondary batteries A2 to A8 were produced.

A battery using nonaqueous electrolyte a2 is referred to as battery A2; a battery using nonaqueous electrolyte a3 is referred to as battery A3; a battery using nonaqueous electrolyte a4 is referred to as battery A4; a battery using nonaqueous electrolyte a5 is referred to as battery A5; a battery using nonaqueous electrolyte a6 is referred to as battery A6; battery using nonaqueous electrolyte a7 is referred to as battery A7; and a battery using nonaqueous electrolyte a8 is referred to as battery A8. With respect to these batteries, like as described above, the cycle performance, 80° C. charge retention characteristics, and overcharging performance were measured and the results thereof were obtained as shown in Table 2. In Table 2, the result of battery A1 is also shown together.

In this case, a nonaqueous electrolyte prepared so that the added amount of succinic anhydride became 0.05% by mass based on the total mass of the nonaqueous electrolyte is referred to as nonaqueous electrolyte a2. Similarly, a nonaqueous electrolyte prepared so that the added amount of succinic anhydride became 0.1% by mass based on the total mass of the nonaqueous electrolyte is referred to as nonaqueous electrolyte a3; a nonaqueous electrolyte prepared so that the added amount of succinic anhydride became 0.6% by mass based on the total mass of the nonaqueous electrolyte is referred to as nonaqueous electrolyte a4; a nonaqueous electrolyte prepared so that the added amount of succinic anhydride became 1.0% by mass based on the total mass of the nonaqueous electrolyte is referred to as nonaqueous electrolyte a5; a nonaqueous electrolyte prepared so that the added amount of succinic anhydride became 3.0% by mass based on the total mass of the nonaqueous electrolyte is referred to as nonaqueous electrolyte a6; a nonaqueous electrolyte prepared so that the added amount of succinic anhydride became 5.0% by mass based on the total mass of the nonaqueous electrolyte is referred to as nonaqueous electrolyte a7; and a nonaqueous electrolyte prepared so that the added amount of succinic anhydride became 6.0% by mass based on the total mass of the nonaqueous electrolyte is referred to as nonaqueous electrolyte a8.

TABLE 2

| Battery | Type and content of solvent | | Cyclic acid anhydride | | Cycle property (%) | 80° C. Charge retention characteristics | | OP |
| --- | --- | --- | --- | --- | --- | --- | --- | --- |
| | Type | Content (% by mass) | Type | Added amount (% by mass) | | Amount of generated gas (mL) | Capacity retention rate (%) | |
| A2 | EC/PC/Methyl pivalate | 30/10/60 | Succinic anhydride | 0.05 | 72 | 3.4 | 57 | 0 |
| A3 | EC/PC/Methyl pivalate | 30/10/60 | Succinic anhydride | 0.1 | 83 | 2.2 | 76 | 0 |
| A1 | EC/PC/Methyl pivalate | 30/10/60 | Succinic anhydride | 0.3 | 88 | 1.5 | 81 | 0 |
| A4 | EC/PC/Methyl pivalate | 30/10/60 | Succinic anhydride | 0.6 | 88 | 1.1 | 81 | 0 |
| A5 | EC/PC/Methyl pivalate | 30/10/60 | Succinic anhydride | 1 | 87 | 1.3 | 80 | 0 |
| A6 | EC/PC/Methyl pivalate | 30/10/60 | Succinic anhydride | 3 | 83 | 1.3 | 78 | 0 |

TABLE 2-continued

| Battery | Type and content of solvent | | Cyclic acid anhydride | | Cycle property (%) | 80° C. Charge retention characteristics | | OP |
| --- | --- | --- | --- | --- | --- | --- | --- | --- |
| | Type | Content (% by mass) | Type | Added amount (% by mass) | | Amount of generated gas (mL) | Capacity retention rate (%) | |
| A7 | EC/PC/Methyl pivalate | 30/10/60 | Succinic anhydride | 5 | 78 | 1.6 | 75 | 0 |
| A8 | EC/PC/Methyl pivalate | 30/10/60 | Succinic anhydride | 6 | 64 | 2.5 | 56 | 2 |

OP = Overcharging Performance

As is apparent from the results shown in Table 2, in batteries A1 and A3 to A7, not only was the cycle performance improved and was the amount of a generated gas during the charge retention at 80° C. small, but also the capacity retention rate was large and the overcharging performance was improved. On the other hand, in batteries A2 and A8, in comparison with batteries A1 and A3 to A7, not only was the cycle performance lowered and was the amount of a generated gas during the charge retention at 80° C. larger, but also the capacity retention rate was smaller and the overcharging performance was lowered.

It is considered that this is because when the added amount of succinic anhydride as a cyclic acid anhydride is so small as 0.05% by mass based on the total mass of the nonaqueous electrolyte, the concentration of oxygen atoms in the negative electrode surface coating film (SEI) is not so increased and consequently, the lithium penetrativity is not improved; and on the other hand, when the added amount of succinic anhydride as a cyclic acid anhydride is so large as 6.0% by mass based on the total mass of the nonaqueous electrolyte, the resistance of the negative electrode surface coating film (SEI) becomes large and consequently, the charging performance of the negative electrode is lowered.

Thus, there can be mentioned that the added amount of succinic anhydride as a cyclic acid anhydride is desirably 0.1% by mass or more and 5.0% by mass or less based on the total mass of the nonaqueous electrolyte. With respect to glutaric anhydride and glycolic anhydride, the added amount thereof is desirably the same as that of succinic anhydride. Further, when these succinic anhydride, glutaric anhydride, and glycolic anhydride are mixed and used, it is necessary that they are mixed so that the total added amount thereof is the same as the added amount in case where these acid anhydrides are used individually, and used.

5. Type and Content of Tertiary Carboxylate Ester (1) Type of Tertiary Carboxylate Ester Next, the type of the tertiary carboxylate ester was studied. Here, as the tertiary carboxylate ester as the nonaqueous solvent, also ethyl pivalate (represented by a general formula (1) (where R1=ethyl group, R2=R3=R4=methyl group)), propyl pivalate (represented by a general formula (1) (where R1=propyl group, R2=R3=R4=methyl group)), isopropyl pivalate (represented by a general formula (1) (where R1=isopropyl group, R2=R3=R4=methyl group)), methyl 2,2-dimethylbutanoic acid (represented by a general formula (1) (where R1=R2=R3=methyl group, R4=ethyl group)), methyl 2-ethyl-2-methybutanoic acid (represented by a general formula (1) (where R1=R2=methyl group, R3=R4=ethyl group)), ethyl 2,2-diethylbutanoic acid (represented by a general formula (1) (where R1=methyl group, R2=R3=R4=ethyl group)), and ethyl 2,2 disopropylpropanate (represented by a general formula (1) (where R1=methyl group, R2=R3=isopropyl group, R4=methyl group)) were prepared. Further, isopentyl pivalate (represented by a general formula (1) (where R1=isopentyl group, R2=R3=R4=methyl group)) and isohexyl pivalate (represented by a general formula (1) (where R1=isohexyl group, R2=R3=R4=methyl group)) were also prepared.

Next, prepared was a nonaqueous electrolyte in which in a solvent mixture produced by mixing ethylene carbonate (EC), propylene carbonate (PC), and each above-described nonaqueous solvent as a tertiary carboxylate ester so that the mass ratio thereof became 30:10:60, succinic anhydride as a cyclic acid anhydride was added so that the content thereof became 0.3% by mass based on the total mass of the nonaqueous electrolyte, and further, $LiPF_6$ as the electrolyte was dissolved so that the concentration thereof became 1 mol/L.

A nonaqueous electrolyte containing ethyl pivalate as a nonaqueous solvent is referred to as nonaqueous electrolyte f1; similarly, a nonaqueous electrolyte containing propyl pivalate is referred to as nonaqueous electrolyte g1; a nonaqueous electrolyte containing isopropyl pivalate is referred to as nonaqueous electrolyte h1; a nonaqueous electrolyte containing methyl 2,2-dimethylbutanoic acid is referred to as nonaqueous electrolyte i1; a nonaqueous electrolyte containing methyl 2-ethyl-2-methybutanoic acid is referred to as nonaqueous electrolyte g1; a nonaqueous electrolyte containing ethyl 2,2-diethylbutanoic add is referred to as nonaqueous electrolyte k1; and a nonaqueous electrolyte containing ethyl 2,2-diisopropylpropanate is referred to as nonaqueous electrolyte l1. Further, a nonaqueous electrolyte containing isopentyl pivalate is referred to as nonaqueous electrolyte m1 and a nonaqueous electrolyte containing isohexyl pivalate is referred to as nonaqueous electrolyte n1.

Then, using these nonaqueous electrolytes f1 to n1, like as described above, nonaqueous electrolyte secondary batteries F1 to N1 were produced. A battery using nonaqueous electrolyte f1 is referred to as battery F1; a battery using nonaqueous electrolyte g1 is referred to as battery G1; a battery using nonaqueous electrolyte h1 is referred to as battery H1; a battery using nonaqueous electrolyte i1 is referred to as battery I1; a battery using nonaqueous electrolyte j1 is referred to as battery J1; a battery using nonaqueous electrolyte k1 is referred to as battery K1; and a battery using nonaqueous electrolyte l1 is referred to as battery L1. Further, a battery using nonaqueous electrolyte m1 is referred to as battery M1 and a battery using nonaqueous electrolyte n1 is referred to as battery N1. With respect to these batteries, like as described above, the cycle performance, 80° C. charge retention characteristics, and overcharging performance were measured and the results shown in the following Table 3 were obtained. In the following Table 3, the result of battery A as described above is also shown together.

(2) Content of Tertiary Carboxylate Ester

Next, the content of the tertiary carboxylate ester was studied. Here, prepared were nonaqueous electrolytes a9 to a18 in

TABLE 3

| Battery | Type and content of solvent | | Cyclic acid anhydride | | | 80° C. Charge retention characteristics | | |
|---|---|---|---|---|---|---|---|---|
| | Type | Content (% by mass) | Type | Added amount (% by mass) | Cycle property (%) | Amount of generated gas (mL) | Capacity retention rate (%) | OP |
| A1 | EC/PC/Methyl pivalate | 30/10/60 | Succinic anhydride | 0.3 | 88 | 1.5 | 81 | 0 |
| F1 | EC/PC/Ethyl pivalate | 30/10/60 | Succinic anhydride | 0.3 | 87 | 1.6 | 80 | 0 |
| G1 | EC/PC/Propyl pivalate | 30/10/60 | Succinic anhydride | 0.3 | 87 | 2.3 | 80 | 0 |
| H1 | EC/PC/Isopropyl pivalate | 30/10/60 | Succinic anhydride | 0.3 | 88 | 2.2 | 76 | 0 |
| I1 | EC/PC/Methyl 2,2-dimethylbutanoic acid | 30/10/60 | Succinic anhydride | 0.3 | 86 | 2.0 | 75 | 0 |
| J1 | EC/PC/Methyl 2-ethyl-2-methylbutanoic acid | 30/10/60 | Succinic anhydride | 0.3 | 88 | 2.3 | 73 | 0 |
| K1 | EC/PC/Ethyl 2,2-diethylbutanoic acid | 30/10/60 | Succinic anhydride | 0.3 | 88 | 2.2 | 74 | 0 |
| L1 | EC/PC/Ethyl 2,2-diisopropyl propanate | 30/10/60 | Succinic anhydride | 0.3 | 86 | 2.5 | 72 | 0 |
| M1 | EC/PC/Isopentyl pivalate | 30/10/60 | Succinic anhydride | 0.3 | 68 | 2.2 | 71 | 1 |
| N1 | EC/PC/Isohexyl pivalate | 30/10/60 | Succinic anhydride | 0.3 | 65 | 3.9 | 66 | 0 |

OP = Overcharging Performance

As is apparent from the results shown in Table 3, in batteries F1 to L1, in substantially the same manner as in battery A1, not only was the cycle performance improved and was the amount of a generated gas during the charge retention at 80° C. small, but also the capacity retention rate was large and the overcharging performance was improved. On the other hand, in batteries M1 and N1, in comparison with batteries A1 and F1 to L1, not only was the cycle performance lowered and was the amount of a generated gas during the charge retention at 80° C. large, but also the capacity retention rate was small and the overcharging performance was lowered. There can be mentioned that it shows that isopentyl pivalate and isohexyl pivalate exhibit no effect of incorporating them.

Thus, there can be mentioned that the tertiary carboxylate ester represented by the general formula (1) is desirably selected from methyl pivalate represented by a general formula (1) (where R1=R2=R3=R4=methyl group), ethyl pivalate represented by general formula (1) (where R1=ethyl group, R2=R3=R4=methyl group), propyl pivalate represented by a general formula (1) (where R1=propyl group, R2=R3=R4=methyl group), isopropyl pivalate represented by a general formula (1) (where R1=isopropyl group, R2=R3=R4=methyl group), methyl 2,2-dimethylbutanoic acid represented by a general formula (1) (where R1=R2=R3=methyl group, R4=ethyl group), methyl 2-ethyl-2-methylbutanoic acid represented by a general formula (1) (where R1=R2=methyl group, R3=R4=ethyl group), ethyl 2,2-diethylbutanoic acid represented by a general formula (1) (where R1=methyl group, R2=R3=R4=ethyl group), and ethyl 2,2-diisopropylpropanate represented by a general formula (1) (where R1=ethyl group, R2=R3=isopropyl group, R4=methyl group), to be used.

which in solvent mixtures produced by mixing EC, PC, and methyl pivalate as a tertiary carboxylate ester in the below-described mass ratios, succinic anhydride as a cyclic acid anhydride was added so that the content thereof became 0.3% by mass based on the total mass of the nonaqueous electrolyte, and further, $LiPF_6$ as the electrolyte was dissolved so that the concentration thereof became 1 mol/L. Then, using these nonaqueous electrolytes a9 to a18, like as described above, nonaqueous electrolyte secondary batteries A9 to A18 were produced.

A battery using nonaqueous electrolyte a9 is referred to as battery A9; a battery using nonaqueous electrolyte a10 is referred to as battery A10; a battery using nonaqueous electrolyte a11 is referred to as battery A11; a battery using nonaqueous electrolyte a12 is referred to as battery A12; a battery using nonaqueous electrolyte a13 is referred to as battery A13; a battery using nonaqueous electrolyte a14 is referred to as battery A14; a battery using nonaqueous electrolyte a15 is referred to as battery A15; a battery using nonaqueous electrolyte a16 is referred to as battery A16; battery using nonaqueous electrolyte a17 is referred to as battery A17; and a battery using nonaqueous electrolyte a18 is referred to as battery A18. With respect to these batteries, like as described above, the cycle performance, 80° C. charge retention characteristics, and overcharging performance were measured and the results thereof were obtained as shown in Table 4. In Table 4, the result of battery A1 as described above is also shown together.

In this case, a nonaqueous electrolyte in which the solvent mixture was prepared so that the content ratio of EC, PC, and methyl pivalate relative to the total mass of the nonaqueous solvent became 50:49:1, is referred to as nonaqueous electrolyte a9. Similarly, a nonaqueous electrolyte in which the solvent mixture was prepared so that the content ratio of EC, PC, and methyl pivalate relative to the total mass of the nonaqueous solvent became 50:48:2, is referred to as nonaqueous electrolyte a10; a nonaqueous electrolyte in which the solvent mixture was prepared so that the content ratio of EC, PC, and methyl pivalate relative to the total mass of the nonaqueous solvent became 50:47:3, is referred to as nonaqueous electrolyte a11; a nonaqueous electrolyte in which the solvent mixture was prepared so that the content ratio of EC, PC, and methyl pivalate relative to the total mass of the nonaqueous solvent became 50:45:5, is referred to as nonaqueous electrolyte a12; a nonaqueous electrolyte in which the solvent mixture was prepared so that the content ratio of EC, PC, and methyl pivalate relative to the total mass of the nonaqueous solvent became 50:40:10, is referred to as nonaqueous electrolyte a13; a nonaqueous electrolyte in which the solvent mixture was prepared so that the content ratio of EC, PC, and methyl pivalate relative to the total mass of the nonaqueous solvent became 50:30:20, is referred to as nonaqueous electrolyte a14; a nonaqueous electrolyte in which the solvent mixture was prepared so that the content ratio of EC, PC, and methyl pivalate relative to the total mass of the nonaqueous solvent became 40:20:40, is referred to as nonaqueous electrolyte a15; a nonaqueous electrolyte in which the solvent mixture was prepared so that the content ratio of EC, PC, and methyl pivalate relative to the total mass of the nonaqueous solvent became 30:0:70, is referred to as nonaqueous electrolyte a16; a nonaqueous electrolyte in which the solvent mixture was prepared so that the content ratio of EC, PC, and methyl pivalate relative to the total mass of the nonaqueous solvent became 20:0:80, is referred to as nonaqueous electrolyte a17; and a nonaqueous electrolyte in which the solvent mire was prepared so that the content ratio of EC, PC, and methyl pivalate relative to the total mass of the nonaqueous solvent became 15:0:85, is referred to as nonaqueous electrolyte a18.

As is apparent from the results shown in Table 4, in batteries A1 and A11 to A17, not only was the cycle performance improved and was the amount of a generated gas during the charge retention at 80° C. small, but also the capacity retention rate was large and the overcharging performance was improved. On the other hand, in batteries A9, A10 and A18, in comparison with batteries A1 and A11 to A17, not only was the cycle performance lowered and was the amount of a generated gas during the charge retention at 80° C. large, but also the capacity retention rate was small and the overcharging performance were lowered.

It is considered that this is because when the content of methyl pivalate as a tertiary carboxylate ester is so small as 1% by mass based on the total mass of the nonaqueous solvent, the effect of incorporating methyl pivalate cannot be exhibited; on the contrary, when the content of methyl pivalate is so large as 85% by mass based on the total mass of the nonaqueous solvent, the battery properties become adversely affected. This is because when the content thereof becomes more than 85% by mass, a reduction-decomposition on the negative electrode cannot be suppressed and the negative electrode surface coating film becomes unstable.

Thus, there can be mentioned that the content of methyl pivalate as a tertiary carboxylate ester is desirably 3% by mass or more and 80% by mass or less based on the total mass of the nonaqueous solvent. With respect to other tertiary carboxylate esters such as ethyl pivalate, propyl pivalate, isopropyl pivalate, methyl 2,2-dimethylbutanoic acid, methyl 2-ethyl-2-methylbutanoic acid, ethyl 2,2-diethylbutanoic acid, and ethyl 2,2-diisopropylpropanate, the content thereof is desirably the same as that of methyl pivalate.

In the above-described embodiments, though examples for incorporating other additives in the nonaqueous electrolyte are not described, for stabilizing the coating film in the interface of the negative electrode or lowering the coating film resistance, other additives may also be incorporated. In this case, examples of the other additives capable of being incor-

TABLE 4

| Battery | Type and content of solvent | | Cyclic acid anhydride | | Cycle property (%) | 80° C. Charge retention characteristics | | OP |
|---|---|---|---|---|---|---|---|---|
| | Type | Content (% by mass) | Type | Added amount (% by mass) | | Amount of generated gas (mL) | Capacity retention rate (%) | |
| A9 | EC/PC/Methyl pivalate | 50/49/1 | Succinic anhydride | 0.3 | 76 | 4.9 | 57 | 2 |
| A10 | EC/PC/Methyl pivalate | 50/48/2 | Succinic anhydride | 0.3 | 77 | 4.5 | 57 | 1 |
| A11 | EC/PC/Methyl pivalate | 50/47/3 | Succinic anhydride | 0.3 | 82 | 3.2 | 66 | 0 |
| A12 | EC/PC/Methyl pivalate | 50/45/5 | Succinic anhydride | 0.3 | 85 | 2.5 | 71 | 0 |
| A13 | EC/PC/Methyl pivalate | 50/40/10 | Succinic anhydride | 0.3 | 87 | 2.1 | 72 | 0 |
| A14 | EC/PC/Methyl pivalate | 50/30/20 | Succinic anhydride | 0.3 | 86 | 2.2 | 75 | 0 |
| A15 | EC/PC/Methyl pivalate | 40/20/40 | Succinic anhydride | 0.3 | 89 | 2.0 | 75 | 0 |
| A1 | EC/PC/Methyl pivalate | 30/10/60 | Succinic anhydride | 0.3 | 88 | 1.5 | 81 | 0 |
| A16 | EC/PC/Methyl pivalate | 30/0/70 | Succinic anhydride | 0.3 | 83 | 1.7 | 74 | 0 |
| A17 | EC/PC/Methyl pivalate | 20/0/80 | Succinic anhydride | 0.3 | 79 | 1.6 | 65 | 0 |
| A18 | EC/PC/Methyl pivalate | 15/0/85 | Succinic anhydride | 0.3 | 75 | 2.7 | 48 | 2 |

OP = Overcharging Performance porated in the nonaqueous electrolyte include vinylene carbonate, vinylethylene carbonate, trifluoromethylvinylene carbonate, 4-fluoroethylene carbonate, trifluoropropylene carbonate, carbon dioxide gas, 1,3-dioxane, 4-methyl-1,3-dioxane, 1,3-dioxolane, 4-methyl-1,3-dioxolane, tetrahydrofuran, diethoxyethane, dimethoxyethane, tert-amylbenzene, tert-butylbenzene, cyclohexylbenzene, and biphenyl. Among them, carbon dioxide gas, 1,3-dioxane, diethoxyethane, and tert-amylbenzene are preferred because they improve higher temperature cycle.

What is claimed is:

1. A nonaqueous electrolyte secondary battery comprising:
a positive electrode having a positive electrode active material capable of intercalating/deintercalating lithium ions;
a negative electrode having a negative electrode active material capable of intercalating/deintercalating lithium ions; and
a nonaqueous electrolyte in which an electrolyte composed of a lithium salt is dissolved in a nonaqueous solvent, the nonaqueous electrolyte containing:
a tertiary carboxylate ester represented by the following general formula (1) in an amount of a range of 40% by mass or more and 80% by mass or less based on the total mass of the nonaqueous solvent:

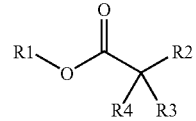

(1)

where R1, R2, R3, R4 represent a (C1 to 4) alkyl group, respectively; and one or more acid anhydride selected from succinic anhydride, glutaric anhydride, and glycolic anhydride in an amount of a range of 0.1% by mass or more and 5% by mass or less based on the total mass of the nonaqueous electrolyte.

2. The nonaqueous electrolyte secondary battery according to claim 1, wherein the tertiary carboxylate ester is at least one selected from methyl pivalate, ethyl pivalate, propyl pivalate, isopropyl pivalate, methyl 2,2-dimethylbutanoic acid, methyl 2-ethyl-2-methylbutanoic acid, ethyl 2,2-diethylbutanoic acid, and ethyl 2,2-diisopropylpropanate.

* * * * *